United States Patent [19]
Roddy et al.

[11] 3,900,234
[45] Aug. 19, 1975

[54] DIE CAST SUPPORT HAVING NO EFFECTIVE DRAFT

[75] Inventors: Joseph T. Roddy, Ballwin; Russell D. Begley, Florissant, both of Mo.

[73] Assignee: Emerson Electric Co., St. Louis, Mo.

[22] Filed: Apr. 30, 1973

[21] Appl. No.: 355,788

[52] U.S. Cl. .................................. 308/15; 310/90
[51] Int. Cl.² ........................................ F16C 13/02
[58] Field of Search ............ 310/51, 89, 85, 90, 91; 308/15; 249/175

[56] References Cited
UNITED STATES PATENTS

| | | | |
|---|---|---|---|
| 3,075,265 | 1/1963 | Stumph | 249/175 |
| 3,343,016 | 9/1967 | Lewis | 310/91 |
| 3,361,914 | 1/1968 | Janssen | 310/51 |
| 3,437,853 | 4/1969 | Arnold | 310/89 |
| 3,717,779 | 2/1973 | Hallerback | 310/91 |
| 3,786,290 | 1/1974 | Papst | 310/90 |

*Primary Examiner*—M. Henson Wood, Jr.
*Assistant Examiner*—Gene A. Church
*Attorney, Agent, or Firm*—Polster and Polster

[57] ABSTRACT

A die cast bearing support structure is provided having an axial opening through it which receives a bearing in a press fit. The bearing supports and permits rotation of a shaft. The draft of the wall defining the opening through the die cast bearing support structure effectively is zero and the bearing may be positioned without previous machining of the wall defining opening.

14 Claims, 4 Drawing Figures

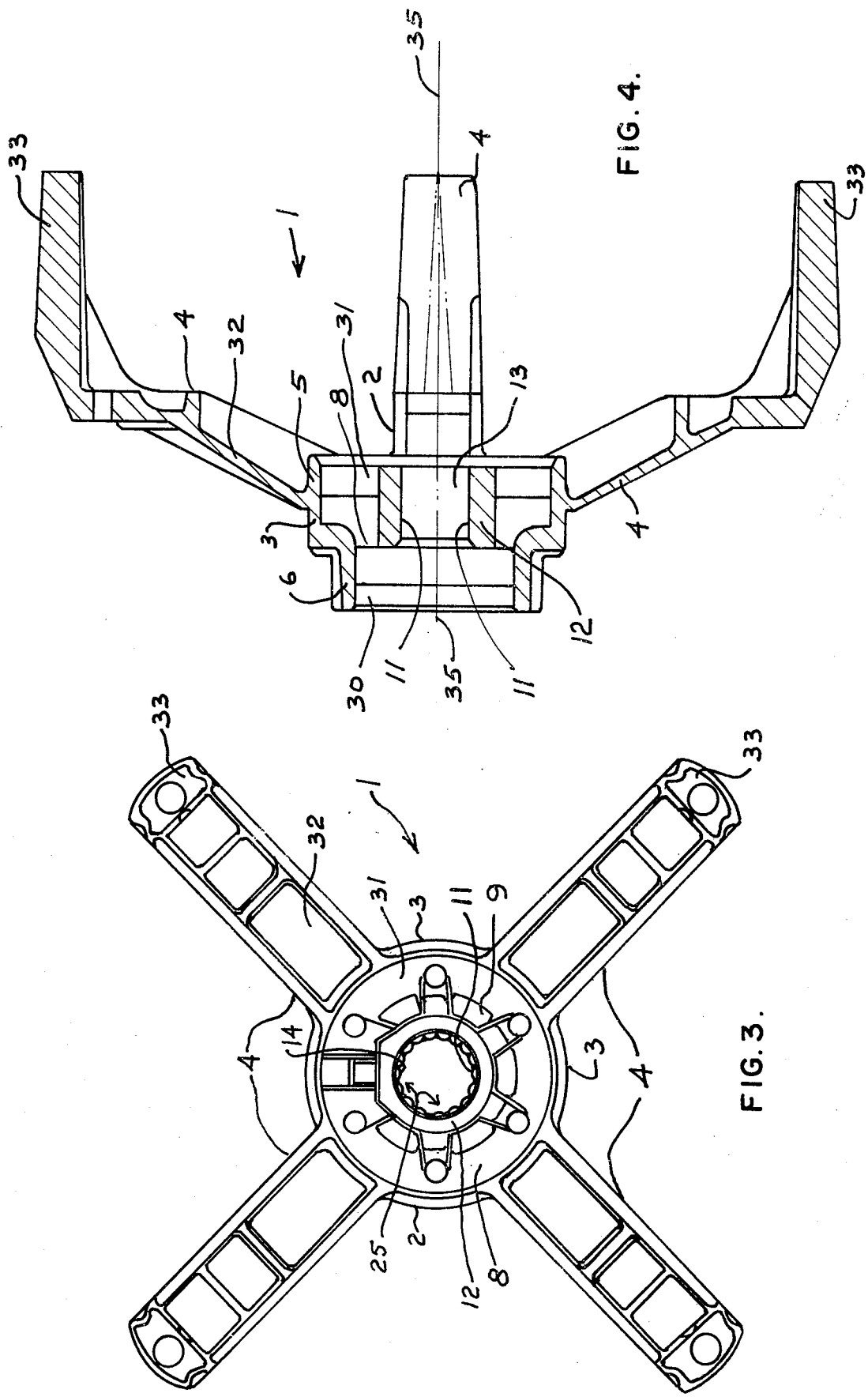

DIE CAST SUPPORT HAVING NO EFFECTIVE DRAFT

BACKGROUND OF THE INVENTION

This invention relates to bearing support structures and in particular, to a die cast part having zero effective draft along that portion of the part having an axial opening in it. The axial opening receives a bearing in a press fit. While the invention is described with particular reference to motor end shields for dynamoelectric machines, those skilled in the art will recognized the wide applicability of this invention to other die cast press fit structures.

In many motor applications, a stator assembly has a rotor assembly including a shaft rotatably associated with it. The stator and rotor assemblies are enclosed in a shell and the shaft ends are supported by motor end shields which are fitted to the shell and include a central hub portion having a bearing mounted in an opening through the hub. More recently, the shell has been eliminated and the motor end shields are mounted directly to the stator assembly.

The stator assembly includes a core of magnetic material having an axial bore opening through it. A plurality of slots extend radially outwardly from the bore. The slots receive the motor windings and the rotor assembly is carried in the bore opening. The shaft is supported at two points on opposite ends of the stator assembly by the end shields. The more recent end shield designs mentioned above often are a skeleton design. Attachment between the end shields and the stator assembly can be accomplished by any convenient method. Epoxy adhesive works well. End shields generally have a central hub which has an axial opening through it. A bearing structure is mounted in the opening through the hub. The shaft extends through the end shield on at least one end of the motor and is rotatably supported by the bearing structure on both ends of the motor. The rotor assembly is driven by the stator assembly in accordance with well known electromechanical principles.

End shields conventionally are die cast from aluminum or other suitable material. As in conventional in die cast work, the end shield is designed with a draft or taper to it, so that the end shield can be withdrawn easily from the die used to cast it. The hub of the motor end shield must be of sufficient axial length so that it properly supports the bearing structure and the rotatable shaft. The taper of the end shield along this axial length, required by the die cast manufacturing process, heretofore has been sufficient to prevent press fitting of the bearing structure directly into the axial opening. That is, the bearing structure tended to become misaligned from the centerline axis of the motor because the taper of the die cast part inherently resulted in diametric differences within the confines of the axial opening which necessarily prevented proper placement of the bearing structure. Consequently, the axial opening through the hub is machined or bored in order to provide a cylindrical opening for reception of the bearing.

The invention disclosed hereinafter eliminates the need for a machined opening in a die cast bearing support structure by providing an opening in the bearing support structure effectively having zero draft.

One of the objects of this invention is to provide a die cast bearing support structure having a bearing press fit into an opening in the bearing support without the need for a previous machining operation on the opening.

Another object of this invention is to provide a low cost bearing support structure.

Still another object of this invention is to provide a die cast bearing support structure having an opening in it which approximates a machined, cylindrical opening in the structure.

Other objects of this invention will be apparent to those skilled in the art in light of the following description and accompanying drawings.

SUMMARY OF THE INVENTION

In accordance with this invention, generally stated, a die cast structure is provided which has an opening in it. The opening is manufactured so that it affords zero draft, enabling the opening to receive a second structure in a press fit.

The preferred embodiment is a bearing support structure in the form of an end shield for a dynamoelectric machine. The end shield is die cast with an integral bearing housing having an axial opening in it. The opening effectively has zero draft for receiving a bearing in a press fit.

BRIEF DESCRIPTION OF THE DRAWINGS

In the drawings,

FIG. 3 is a rear elevational view of the end shield shown in FIG. 2; and

FIG. 4 is a sectional view taken along the line 4—4 of FIG. 2.

DESCRIPTION OF THE PREFERRED EMBODIMENT

Figure 1:
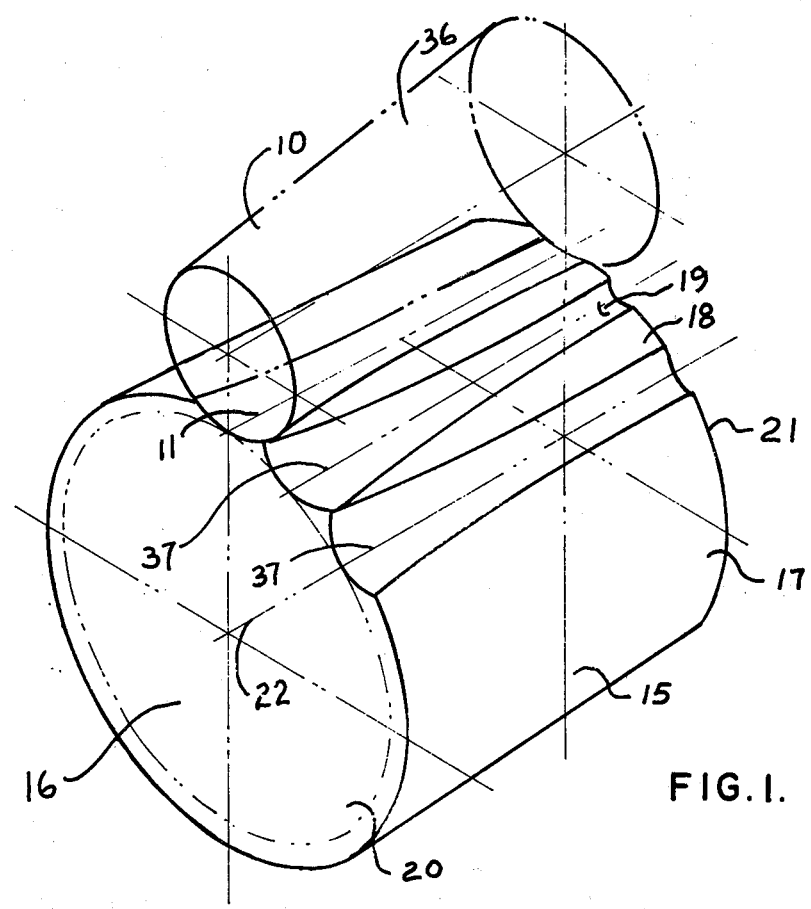
FIG. 1 is a somewhat diagrammatic view of a core pin formation for use in a mold giving effective zero draft to the opening formed about the core pin.

In the drawings, reference numeral 1 indicates a bearing support structure embodied in a motor end shield 2. The end shield 2 is a skeleton structure and includes a central hub 3 having a plurality of legs 4 extending radially outwardly from it.

The central hub 3 encompasses a first ring 5 which narrows axially to define a second ring 6, integrally formed with the first ring 5, and a bearing housing 12. The legs 4 are joined to the hub 3 along the ring 5. Legs 4 are conventional and may assume a variety of configurations. Each of the legs 4 has a radially outwardly extending part 32 and an axially extending part 33. The end shield 2 in the embodiment illustrated, is attached to a stator assembly of a dynamoelectric machine along the part 33. Attachment is accomplished by any convenient method. Epoxy adhesive works well. Other end shield designs may be utilized with the invention disclosed hereinafter, the particular design shown and described merely being illustrative of the multitude of designs available.

The rings 5 and 6 have a plurality of notches 7 formed in them which are utilized to attach additional conventional structure, neither shown nor forming a part of this invention, to the end shield 2. Such additional structure is used in mounting a motor, to which the end shield 2 is attached, to a particular application, for example. The rings 5 and 6 also have axial openings 31 and 30 respectively through them. A wall 8 extends radially inwardly from the rings 5 and 6 at the junction defined by the radial narrowing of the rings, as is best seen in FIG. 4. The wall 8 has a plurality of openings 9 through it which are useful, in certain motor applications, for permitting communication between the openings 30 and 31. The openings 30 and 31 provide an area for mounting certain structure within the hub 3. Such structure, as will be recognized by those skilled in the art, conventionally includes "oil slingers" and the like which prevent the lubricating oil from running down the motor shaft, for example, thereby drying out the shaft bearing. Wall 8 also has the bearing housing 12 integrally formed with it. The bearing housing 12 extends axially of the hub 3, with the opening 31. Housing 12 is particularly associated with the invention disclosed herein.

As indicated above, the end shield 2 conventionally is constructed from aluminum or similar material and is die cast to any particular desired configuration. Die casting molds are constructed with a predetermined draft or taper, conventionally approximately 2°, so that the work piece may be extracted from the die or mold after casting. Without utilization of some draft for the die cast molds, the work piece often cannot be extracted without damage. The bearing housing 12 has an axial opening 13 through it. Because of the draft requirement in die casting, the taper of an internal wall 14 surrounding the opening 13 ordinarily was such as to preclude the press fitting of the bearing within the opening 13. That is, the diameter of the opening 13 at one end of the bearing housing 12 was so much greater than the diameter of the opening 13 at the other end of the bearing housing 12 that any bearing structure press fit within the opening 13 tended to tilt off a centerline axis indicated by the numeral 35. Because of the rather restrictive air gap requirements for dynamoelectric machines, the tilting tendency of the press fit bearing made it unacceptable. To alleviate this problem, it heretofore has been conventional to machine the opening 13 after casting in order to give the opening 13 a true cylindrical shape throughout the length of the housing 12, the bearing being press fit in the opening 13 after machining. Our invention eliminates the need for the machining operation and the principle of the invention can best be shown with reference to FIG. 1.

Figure 2:
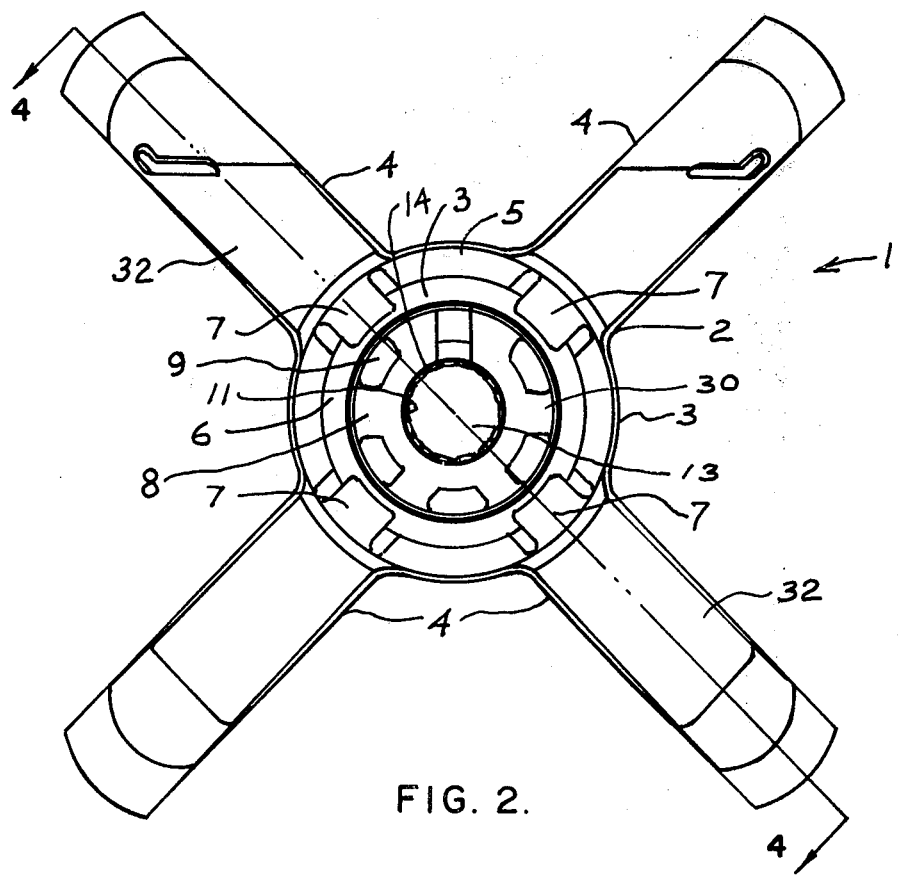
FIG. 2 is a front elevational view of a motor end shield having an effective zero draft, cast central opening through it.

FIG. 1 is a rather diagrammatic view of the construction of a core pin 15 used in conjunction with the die cast mold of the end shield shown in FIG. 2. Core pin 15 conventionally is a solid body 16 having a side wall 17 extending between an end 20 and an end 21 of the pin 15. The side wall 17 has the usual 2° draft associated with it, in accordance with well known die casting techniques. The side wall 17 is fluted and defines a plurality of lands 18 and grooves 19. The lands 18 and grooves 19 extend from and between an end 20 and an end 21 of the pin 15.

A frustum 10 is shown in phantom lines and is important for explanation purposes. As may be visualized, a plurality of frustums 10 may be arranged in an annular array so that a surface line portion 11 on a side wall surface 36 of each individual frustum 10 is parallel to and radially spaced from a central axis 22 of the core pin 15. When the annular array of the frustums 10 is placed about the core pin 15 so that each of the surface lines 11 are parallel to the axis 22, core pin 15 will have a series of the lands 18 and grooves 19 completely about the perimeter of the body 16. The lands, being a part of the side wall 17, have a 2° draft associated with them. Each of the grooves 19 will have a linear surface part 37 congruent to the surface line 11 of the frustum 10. Each of the surface parts 37 consequently also are parallel to the axis 22 of the core pin 15. It may be observed that the grooves 19 will have a large radius at the end 21 of the core pin 15 and a small radius at the end 20 of the core pin 15. That is to say, with the end 21 being the small end of core pin 15 because of the draft associated with the core pin, the circle from which the radius at the end 21 is a part is much larger than the circle from which the radius at the end 20 is a part.

If the core pin 15 now is translated mentally to a die for casting the end shield 2, the annular array of frustums 10 becomes the material of the end shield surrounding the core pin 15. As the die and the end shield 2 are separated in manufacturing, a situation corresponding to moving the core pin 15 leftward in FIG. 1, the cast metal of the end shield 2 only contacts the core pin 15 along the surface part 37 after initial die-end shield breakaway. All other portions of the end shield 2, and in particular, the wall 14 of the opening 13, clear the pin 15 because of the geometry of the core pin 15. Since the material of the end shield 2 may be considered a frustum, the diameter of that material is decreasing as the core pin 15 and end shield 2 are drawn apart. Although there is contact between the core pin 15 and the material of the end shield 2, in the area of the opening 13, that contact necessarily exists only along the surface part 37 and is insufficient to damage any part of the shield 2. While the exact technical reasons for the lack of damage to the end shield 2 during its extraction from the die is unknown, it is theorized that after initial breakaway, the clearance provided by the core pin 15 design enables the metal of the end shield 2 to contract freely, decreasing the hoop stress forces between the material of the end shield 2 and the core pin 15. Regardless of the theory, however, use of a core pin constructed in accordance with the principles of this invention results in an opening 13 in the bearing housing 12 defined by the wall 14 having a plurality of scallops formed in it.

The scallops 25, in effect, may be considered portions of the individual frustums 10 and each of the scallops 25 have a surface line portion 11 that is parallel to the centerline axis 35 of the opening 13 and end shield 2. Consequently, the opening 13 is defined in part by an annular array of parallel surface line portion 11, which permit the opening 13 to exhibit the same properties as a completely cylindrical opening. After die casting, a bearing structure, not shown, may be press fit within the opening 13 without the tilting tendency prevalent in the prior art, and the opening 13 need not be machined.

Numerous variations, within the scope of the appended claims, will be apparent to those skilled in the art in light of the foregoing description and accompanying drawings. Thus, while a frustoconical shape is illustrated in FIG. 1 for forming the core pin 15, other frustums are compatible with the broader aspects of this invention in designing the core pin 15. Likewise, the bearing support 1 may assume a variety of shapes, the end shield 2 design shown merely being illustrative. As indicated above, the support structure 1 need not be associated with a dynamoelectric machine. While the core pin 15 is illustrated as having a generally cylindrical body portion 6 with a tapered side wall, other shapes are compatible with the broader aspects of our invention. In like manner, the surface parts 37 and surface lines 11, while described as parallel to various axis, may vary somewhat from absolute parallelism. That is, the surface lines 11 and surface parts 37 in actuality may vary slightly from an absolute parallel relationship because of manufacturing tolerances or other considerations, without affecting the zero draft nature of the die cast work piece. These variations are merely illustrative.

Having thus described the invention, what is claimed and desired to be secured by Letters Patent is:

1. In a die cast bearing support including a hub portion intended to receive a second structure having a longitudinal length in a press fit, the improvement comprising a housing in said hub portion having an axial opening in it for receiving said second structure, said opening having a longitudinal axis, said opening being defined by a wall having a plurality of protrusions extending radially inwardly from said wall, the radially innermost part of each of said protrusions being approximately parallel to said longitudinal axis for a length at least equal to the longitudinal length of said second structure.

2. The improvement of claim 1 wherein each of said protrusions has a shape in silhouette of a section of a frustum.

3. The improvement of claim 2 wherein said protrusions are frustoconical shapes, a continuous plurality of said frustoconical shapes being formed adjacent one another and extending radially inwardly of said opening.

4. The improvement of claim 3 further characterized by a plurality of legs extending outwardly from said hub portion.

5. The improvement of claim 4 wherein each of said protrusions have at least a plurality of aligned points along the radially innermost part of each of said protrusions which are parallel to said longitudinal axis for the entire length of said opening.

6. A die cast bearing support comprising:
a supporting structure including a bearing housing having a longitudinal axis, said bearing housing having an opening in it about said longitudinal axis, said bearing housing including a wall defining said opening, said wall having a plurality of scallops formed with it and arranged so as to extend inwardly of said opening, each of said scallops having a surface part approximately parallel to said longitudinal axis, the surface parts of said plurality of scallops defining an effective diameter for said opening, said surface parts permitting said bearing support to be die cast with zero effective draft along said opening.

7. The bearing support of claim 6 adapted to function as an end shield for a dynamoelectric machine, said bearing support being further characterized by at least one member extending radially outwardly from said bearing housing for attaching said bearing support to another structure.

8. In a die cast bearing support having a longitudinal axis including a bearing housing having a longitudinal opening therethrough about said axis, the improvement which comprises means for providing a longitudinal opening with zero effective draft in said support, said effective zero draft providing means comprising a wall of said bearing housing defining said opening, said wall having a plurality of protrusions extending outwardly of said wall, each of said protrusions having a surface portion approximately parallel to said longitudinal axis, said protrusions delimiting the effective diameter of said opening.

9. The improvement of claim 8 wherein said protrusions have the shape of a partial frustum in silhouette.

10. The improvement of claim 9 further characterized by a central hub, said bearing housing being integrally formed with said central hub.

11. The improvement of claim 10 wherein each of said plurality of partial frustums are partial frustoconical shapes.

12. The bearing support of claim 11 wherein said bearing support is symmetrically constructed, said hub structure occupying the central portion of said bearing support, said protrusile array comprising a plurality of partial frustums arranged about the perimeter of said opening.

13. The bearing support of claim 11 wherein each of said partial frustra are partial frustoconical shapes.

14. A die cast bearing support comprising:
a hub structure including a bearing housing, said bearing housing having a longitudinal axis and an opening in said bearing housing about said longitudinal axis, said bearing housing including a wall having an annular protrusile array extending outwardly from it, individual elements of said array having a surface portion approximately parallel to said longitudinal axis, said array delimiting the effective diameter of said opening, said array permitting said opening to be die cast with zero effective draft; and
means for mounting said bearing support to a second structure.

* * * * *